Feb. 15, 1927.  1,617,451
W. H. KNISKERN
HIGH PRESSURE JOINT
Filed Aug. 16, 1923   2 Sheets-Sheet 1

INVENTOR
WALTER H. KNISKERN
BY
ATTORNEYS

Feb. 15, 1927.

W. H. KNISKERN 1,617,451

HIGH PRESSURE JOINT

Filed Aug. 16, 1923   2 Sheets-Sheet 2

INVENTOR
WALTER H. KNISKERN
BY
ATTORNEYS

Patented Feb. 15, 1927.

1,617,451

UNITED STATES PATENT OFFICE.

WALTER H. KNISKERN, OF SYRACUSE, NEW YORK, ASSIGNOR TO ATMOSPHERIC NITROGEN CORPORATION, OF SOLVAY, NEW YORK, A CORPORATION OF NEW YORK.

HIGH-PRESSURE JOINT.

Application filed August 16, 1923. Serial No. 657,676.

My invention relates to joints and more particularly to joints in connection with high pressure vessels such as those used in a pressure process for the synthesis of ammonia from nitrogen and hydrogen and has for its object to provide a simple and efficient arrangement whereby an efficient joint is secured throughout substantially the entire life of the apparatus and in which the internal pressure is utilized to tighten the joint and make the same fluid or gas tight. Other more specific objects will appear from the description hereinafter.

Figure 1:
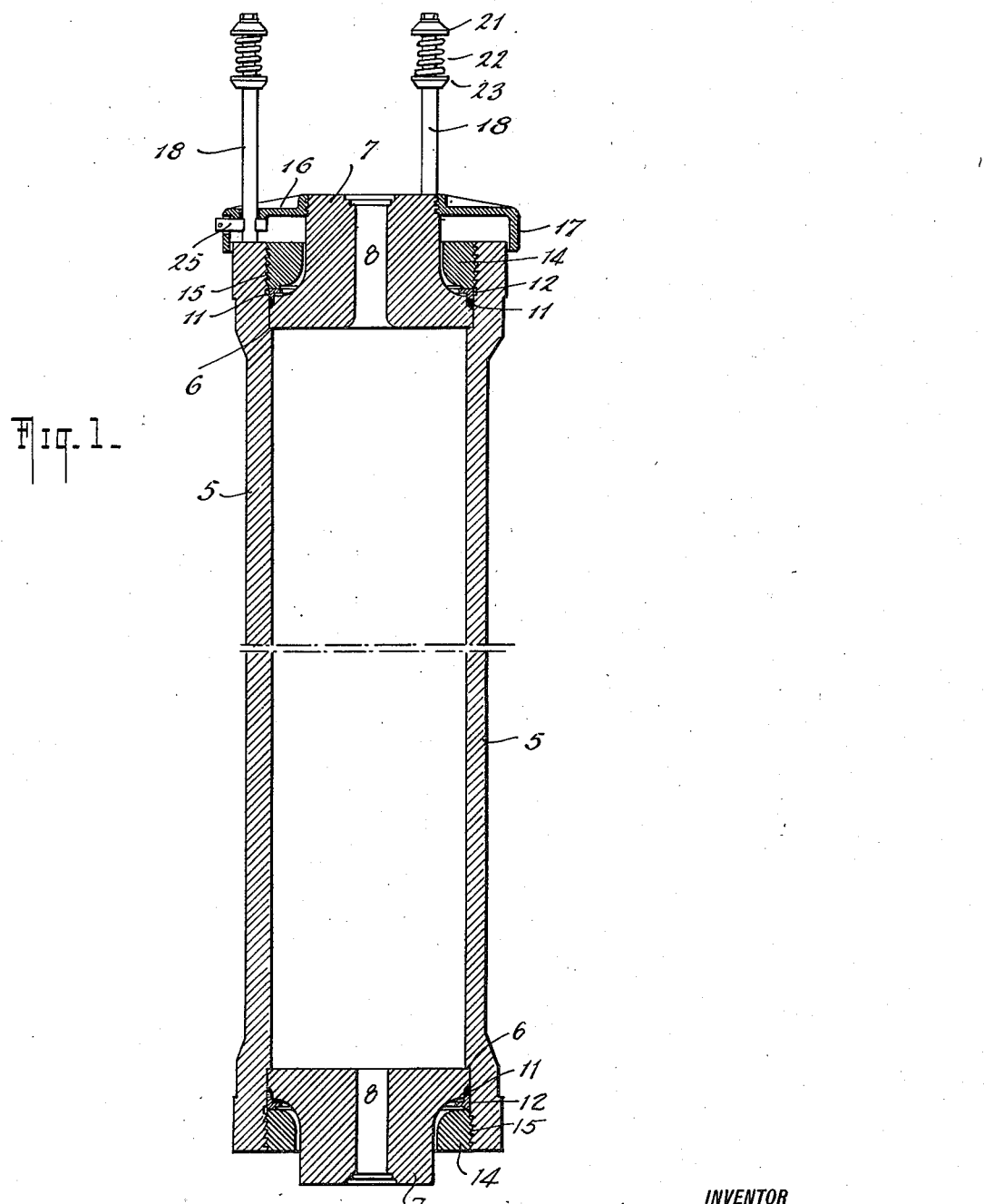
Figure 2:
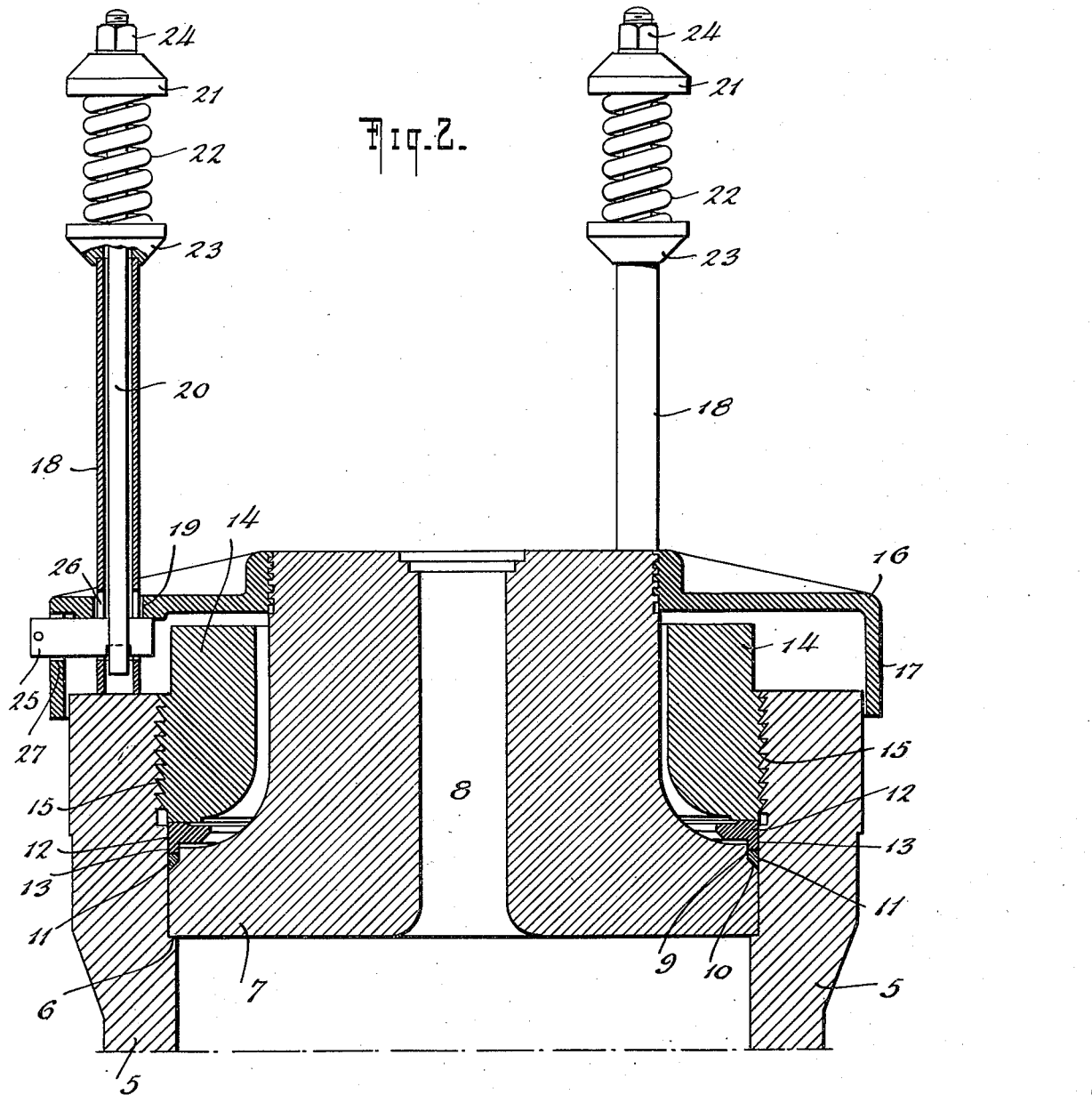

In the accompanying drawings the invention is incorporated in apparatus suitable for use in the de Jahn ammonia process, it being understood that this is merely by way of example and without defining the limits of the invention. In said drawings, Fig. 1 is an elevation partly in section of an ammonia converter; Fig. 2 is a fragmentary sectional view on an enlarged scale of the end of the converter of Fig. 1.

In the drawings, 5 represents a shell capable of resisting high internal pressures. At its opposite ends the shell is provided with interior annular shoulders 6, each of which is shown as engaged by a head 7. Each head fits into the shell and is provided with a suitable passage 8 which is in communication with a pipe or conduit. The construction of the head is always in accordance with the purpose for which the apparatus in which it is incorporated is intended and the passages 8, if such are included in the head, are correspondingly in accord with the operative purposes of said apparatus.

As shown in Fig. 2 the head is provided upon its exterior with an annular groove 9 provided preferably with a tapering surface as indicated at 10. In the assembled condition of the apparatus a gasket 11 of soft metal such as copper is fitted within the recess 9 in engagement with the surface 10 thereof and also in contact with the contiguous interior surface of the shell 5. A follower ring 12 of steel or other suitable metal surrounds the head 10 and is fitted within the shell 5; the follower ring 12 is provided with an annular flange 13 which bears with its thrust-receiving surface against the gasket 11, whereas the lateral faces of this ring are in what is practically surface contact with the shell 5 and the head 7. The ring 12, in turn, is engaged by a breech screw 14 which screws into the shell 5. The latter is screwthreaded at its opposite ends as indicated at 15 for the purpose of accommodating said breech screw 14.

In practice the breech screw which may be of massive dimensions is screwed down, for instance, by means of hydraulic jacks or any other suitable means, producing the desired turning force on said breech screw, and thus bears against the steel or other follower ring 12; the annular flange 13 of the latter is thus forced against the copper or other gasket 11 and firmly holds the same in the recess 9. Any internal pressure which is generated within the shell 5, being effective against the head 7, will tend to force the same outwardly, which tendency is resisted by the follower ring 12 and the breech screw 14. With the illustrated and described arrangement therefore the combined effect of the internal pressure within the shell 5 and the resistance offered by the breech screw 14 and follower ring 12 is that of pressure exerted on the copper gasket 11 which, being confined on all sides, flows in such a manner that it fits exactly into the recess 9 of the head and against the shell 5 and thus provides an absolutely gas or fluid tight connection. This result is attained even with vessels of as much as forty inches inside diameter and in which the contained gas is more than sixty percent hydrogen, is at about 100 atmospheres pressure and is heated to above 400° C. Pressures such as these tend to unseat the upper head 7 from the shoulder 6 but upon decrease of pressure, to allow separation between the head and gasket and the admission of dust and foreign matters which in time make the seal imperfect. To prevent such action and to preserve the relation between the head and the gasket, provision is made in the rods and spring mechanism 18—26 to keep undisturbed whatever may be the relation established between the head 7 and the gasket 11 by the internal pressure after said pressure suffers diminution.

In the preferred arrangement the head 7 is screw-threaded to receive a dust cover 16 having a peripheral depending flange 17 extending over the shell 5 as shown in Fig. 1. This dust cover serves to prevent the admission of dust or other foreign matter. In addition to its other functions the dust cover, in combination with a spring arrangement about to be described, serves to maintain the head 7 in close engagement with the gasket 11 so that when for any reason, such as decreased pressure or temperature conditions within the shell 5, there is any tendency of the elements of the joint to separate, this tendency is overcome by the spring arrangement so that the bearing surfaces are maintained in their original position of contact with each other and no opportunity is given for dirt or other material to work its way between said elements and injure the same. The spring arrangement referred to comprises outer tubes 18 extending through apertures 19 in the dust cover and resting against the end of the shell 5 as shown in Fig. 1. Inner rods 20 extend lengthwise of the tubes 18 and outwardly beyond the same and are provided with members 21 against which one end of springs 22 are fitted, the other ends of said springs being in engagement with members 23 located upon the ends of the tubes 18; for the purpose of adjusting the compression of the springs 22 the outer ends of the rods 20 may be screw-threaded for the accommodation of adjusting nuts 24 which bear against the members 21 and cause the same to move lengthwise of the rods 20 to establish the desired spring compression which obviously will have be sufficient to take up the weight of the head 7 and of the cover 16 and to hold the head, on reduction of internal pressure, in the same position to which the previously higher internal pressure has forced it. The rods at their lower ends are provided with cotters 25 which are supported with snug fit in slots through the rods and then extend radially outward through large slots 26° in the tubes 18 and large slots 27 in the depending flange 17 of the dust cover 16. With this arrangement the springs 22 exert a force on the rods 20 which is communicated by means of the cotters 25 to the dust cover 16 and cause the latter to exert a corresponding force upon the head 7, whereby the latter is maintained in close engagement at all times with the gasket 11.

The construction illustrated and described provides a joint which operates satisfactorily and proves gas-tight under fluctuating operating conditions for an indefinite period of time including numerous shut-downs.

The joint retains its effectiveness as a sealing means indefinitely, primarily because the copper gasket 11 is confined on all sides and is prevented from being deformed under pressure in a manner to cause it to become inefficient as a sealing means or to prevent proper co-operative engagement between the other elements of the joint.

The joint will function irrespective of the axial position of the shell. If the apparatus is horizontally disposed the rod and spring mechanism will be located at each end instead of only at the top as in the vertical position.

The invention is particularly useful in apparatus in which extremely high internal pressures are developed such as, for instance, ammonia converters, and is easily disassembled when, for any reason, access to the interior of the vessel or beyond the point at which the joint is located, is desired.

Various changes in the specific form shown and described may be made within the scope of the claims without departing from the spirit of my invention.

I claim:

1. The combination of a shell in which high pressure is normally existent and having an internal annular shoulder, a head engaging the same and being internally exposed to the action of the pressure in said shell, said head being provided with an annular recess upon its exterior surface, said recess being within said shell, a soft metal gasket located in said recess and arranged to be expanded by the action of the internal pressure on said head, a follower ring engaging said gasket over its entire exposed surface, and a breech screw screwed into said shell and exercising pressure upon said follower ring to press the same against said gasket to thereby resist the action of the aforesaid internal pressure on said head and to prevent extrusion of any material part of said gasket from said recess.

2. The combination of a shell in which high pressure is normally existent and having an internal annular shoulder, a head engaging the same and being internally exposed to the action of the pressure in said shell, said head being provided with an annular recess located interiorly of said shell and having an outwardly inclined surface, a copper gasket fitted in, but of less size than, said recess, and arranged to be expanded by the action of the internal pressure on said head, a follower ring provided with an annular flange adapted to engage the entire exposed surface of said copper gasket and to fit snugly within the open part of the recess, and a breech screw screwed into said shell and engaging said follower ring to force its annular flange into engagement with said gasket to thereby resist the action of the aforesaid internal pressure on said head and to prevent extrusion of any material part of said gasket from said recess.

3. The combination of a shell having an internal annular shoulder, a head engaging the same and provided with an annular recess upon its exterior surface, a soft metal gasket located in said recess, a follower ring engaging said gasket, a breech screw screwed into said shell and engaging said follower ring to press the same against said gasket, outer tubes resting with one end in engagement with said shell, inner rods within said outer tubes, means whereby said inner rods are connected with said head, and springs bearing against said outer tubes and connected with said rods, said springs exerting a pull on said rods and connecting means whereby said head is maintained in pressure-induced engagement with the soft metal gasket notwithstanding reduction of said internal pressures.

4. The combination of a shell capable of withstanding high internal pressure, a head located within an end of said shell to close the same and being subject to the internal pressures therein, said shell and head together forming an annular recess located externally of said head and internally of said shell, a gasket in said recess between said head and shell and means fixed within said shell and engaging said gasket under pressure for resisting movements of said head induced by said internal pressures, the opposed engaging surfaces of said gasket and of said means being approximately coextensive and in registry with each other whereby the resistance offered by said means is equally distributed over the whole of the opposed surface of said gasket and the latter is forced into sealing engagement with said head and shell, in said recess, to seal the connection between the head and shell.

5. The combination of a shell capable of withstanding high internal pressures, a head located within an end of said shell to close the same and being subject to the internal pressures therein, said shell and head together forming an annular recess located externally of said head, a gasket in said recess between said head and shell and having a face corresponding approximately to the width of said recess at its open end, means fixed within said shell externally of said head for resisting movements of said head induced by said internal pressures and an annular flange comprising part of said means and having a width corresponding approximately to the width of said recess, said flange fitting into said recess into coextensive engagement with the face of said gasket under pressure equally distributed over the whole of said face to force said gasket into sealing engagement with the head and shell, in said recess, to seal the connection between said head and shell.

6. The combination of a shell capable of withstanding high internal pressures, a head located within an end of said shell to close the same and being subject to said internal pressures, means fixed within said shell for resisting the forces of said internal pressures as exerted upon said head, a gasket between said head and said means and being forced thereby into sealing engagement with the head and shell to seal the connection therebetween and means having a permanent operative relation to said head when the latter is in its operative position and being effective upon said head for preserving the pressure-induced engagement between the head, the gasket and the first named means, notwithstanding reduction of said internal pressures.

7. The combination of a shell capable of withstanding high internal pressures, a head located within an end of said shell to close the same and being subject to said internal pressures, means fixed within said shell for resisting the forces of said internal pressures as exerted upon said head, a gasket between said head and said means and being forced thereby into sealing engagement with the head and shell to seal the connection therebetween and automatic means effective upon said head for automatically preserving the pressure-induced engagement between the head, the gasket and the first named means, notwithstanding reduction of said internal pressures.

8. The combination of a shell capable of withstanding high internal pressures, a head located within an end of said shell to close the same and being subject to said internal pressures, means fixed within said shell for resisting the forces of said internal pressures as exerted upon said head, a gasket between said head and said means and being forced thereby into sealing engagement with the head and shell to seal the connection therebetween and springs tending to move said head outwardly relatively to said shell whereby the pressure-induced engagement between the head, the gasket and the first named means is automatically preserved notwithstanding reduction of said internal pressures.

In testimony whereof I have hereunto set my hand.

WALTER H. KNISKERN.